INVENTORS.
BEN DAVIES
GEORGE F. CARINI
BY
ATTORNEY

United States Patent Office 3,479,194
Patented Nov. 18, 1969

3,479,194
CHEMICALLY BONDED MAGNESITE BRICK
Ben Davies and George F. Carini, Pittsburgh, Pa., assignors to Dresser Industries, Inc., Dallas, Tex., a corporation of Delaware
Continuation-in-part of application Ser. No. 607,983, Jan. 9, 1967. This application Aug. 15, 1968, Ser. No. 756,727
Int. Cl. C04b 35/04, 35/20
U.S. Cl. 106—58
6 Claims

ABSTRACT OF THE DISCLOSURE

Chemically bonded magnesite brick having a soluble sodium phosphate binder and extremely high tensile strength as a result of the formation in service of a calcium sodium silicophosphate bond.

RELATED CASES

This case is a continuation-in-part of application Ser. No. 607,983, filed Jan. 9, 1967, entitled "Chemically Bonded Magnesite Brick." The latter case has been abandoned.

BACKGROUND

Magnesite brick are manufactured substantially from dead burned magnesia which, in refractories art, is termed "magnesite." Chemically bonded brick are those which are bonded by a chemical binder without the use of a burning process. Ceramically bonded brick are those which are bonded by sintering which takes place during a burning process.

This invention is related to the above-mentioned copending application. That application discloses unburned or chemically bonded brick having a calcium silicophosphate bond. This invention is directed to unburned, chemically-bonded magnesite brick having a soluble sodium phosphate binder, which brick may be used (among other places) in the walls of steelmaking open hearth furnaces, in induction furnaces used for melting ferrous and nonferrous metals, and in glass tank regenerator walls and checker settings.

Some recent work regarding testing of phosphates in magnesite brick was reported in "Improved Chemical Bonds For Basic Refractories," by R. W. Limes and R. O. Russell, a paper presented at the American Ceramic Society Annual Meeting, Philadelphia, Pa., May 3, 1965. In that work, it was found that excellent hot tensile strength at 2300° F. could be obtained by bonding magnesites containing dicalcium silicate with long-chain sodium phosphate glasses. It has now been found, however, that these brick had almost no transverse strength when tested at 2600° F.

Accordingly, it is an object of this invention to provide chemically bonded magnesite brick with improved tensile strength (as measured by transverse loading). It is another object to provide a magnesite brick with a sodium phosphate binder that has a modulus of rupture at 2600° F. in excess of 500 p.s.i.

BRIEF DESCRIPTION

This invention is predicated upon the discovery that soluble sodium phosphate binders can impart high-temperature strength as well as room temperature strength to chemically bonded magnesite brick when the $$CaO:SiO_2:P_3O_5$$

weight ratio of the brick is sufficiently close to the dicalcium silicate-tricalcium phosphate join on the $$CaO-SiO_2-P_2O_5$$

ternary diagram.

Preferably, brick made according to this invention are formed from a batch consisting essentially of size-graded dead burned magnesite grain and a soluble sodium phosphate binder. The brick analyze about 2 to 13 $CaO+SiO_2$, and have a $CaO:SiO_2$ weight ratio between about 2:1 and 12:1. The sodium phosphate binder should yield at least about 0.5% $P_2O_5$. The $CaO:SiO_2:P_2O_5$ weight ratio should fall within the approximate area A–B–C–D–E on FIG. 1. The magnesite grain should contain no more than about 1.3% and, preferably, less than 0.5% uncombined or free CaO determined by calculation.

DETAILED DESCRIPTION

Further features and other objects and advantages of this invention will become clear to those skilled in the art by a careful study of the following detailed description. In the detailed description, all sizings are reported by Tyler screen series; all percentages and parts are by weight; chemical analyses were obtained by spectrographic analysis with control by wet chemical analysis, and are reported as oxides in accordance with the present practice of the refractories industry.

The precision and accuracy of analytical spectrochemical data, particularly for CaO, $SiO_2$ and $P_2O_5$, is about ±5.0 percent of the total weight percentage of the oxide reported, as determined by the method described by the American Society for Testing and Materials in Methods for Emission Spectrochemical Analysis (1964). For example, the precision and accuracy for a $P_2O_5$ determination reported to be 1.0 percent would be ±0.5 percent, indicating the $P_2O_5$ contained in the sample analyzed by spectrochemical techniques to be between 0.95 and 1.05 weight percent. The precision and accuracy of CaO, $SiO_2$ and $P_2O_5$ ratios, which are calculated by normalizing weight percentage spectrochemical data for these oxides to 100, closely approximates the ±5.0 percent precision and accuracy of the analytical spectrochemical data. Consequently, the precision and accuracy for a normalized CaO ratio calculated to be 60 is ±3.0, indicating the CaO ratio to be between 57 and 63. This is the reason that compositions of the invention are stated to be sufficiently close to the dicalcium silicate-tricalcium phosphate join or in the approximate area A–B–C–D–E.

Figure 1:
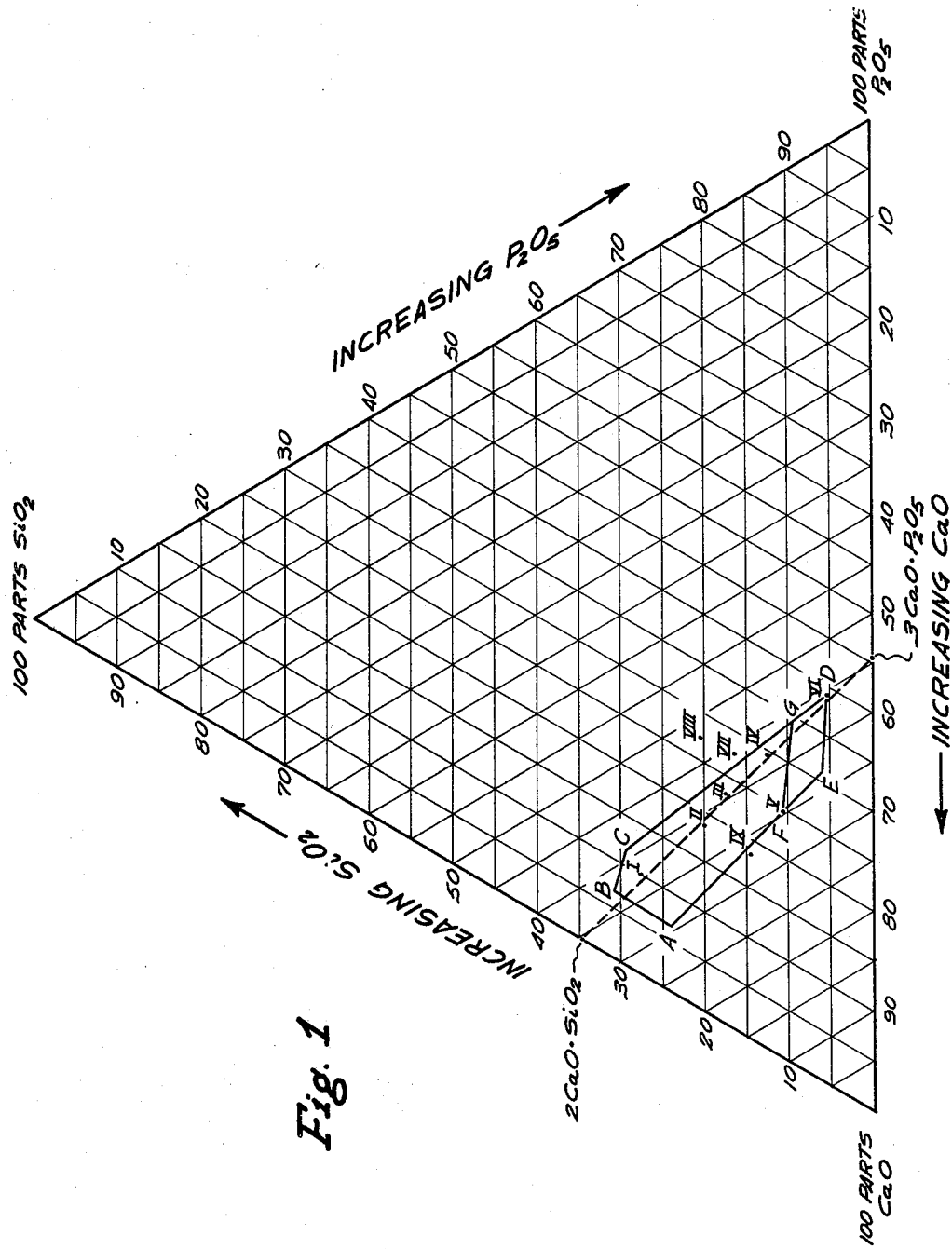
FIG. 1 is a ternary diagram which graphically shows the $CaO:SiO_2:P_2O_5$ weight ratios which are suitable for brick manufacture according to the teachings of this invention.

The detailed discussion is made with reference to FIG. 1, which is a ternary diagram on which the relative proportions of CaO, $SiO_2$, and $P_2O_5$ of the exemplary mixes are plotted. Proportions were calculated from the chemical analysis without reference to MgO, or other oxides, the major components of the refractory which, of course, have no influence on proportions of the CaO, $SiO_2$, and $P_2O_5$.

FIG. 1 utilizes the principles which characterize all such three-component diagrams. In FIG. 1, each side of an equilateral triangle was divided into 100 parts, each fifth part being intersected by a line parallel to each of the other two sides. A point at each corner represents 100 parts, by weight, of one of the three components. In FIG. 1, the apex represents 100 parts of $SiO_2$; the lower left-hand corner represents 100 parts of CaO; and the lower right-hand corner represents 100 parts of $P_2O_5$. In any ternary diagram, the three sides are binary systems. For example, a point on the base line of FIG. 1 is composed exclusively of the lower corner components CaO and $P_2O_5$. The relative distance of a point from each of the three corners may be expressed in parts; and it, thus, may represent a proportion composition of a ternary mixture. All points on a line through one of the corners must have the same ratio of the components of the other two corners.

This invention is based upon the discovery that certain calcium sodium silicophosphates provide a refractory bond for magnesite brick. Briefly, we have found that those brick in which the $CaO:SiO_2:P_2O_5$ weight ratio falls near the dicalcium silicate-tricalcium phosphate join on the diagram have unexpectedly high hot tensile strength. By dicalcium silicate-tricalcium phosphate join, we mean the line on the diagram joining the compound of CaO and $SiO_2$ having a molar ratio of 2:1 and the compound of CaO and $P_2O_5$ having a molar ratio of 3:1. Except where molar ratio is specified, the oxide ratios referred to in this specification are by weight.

A series of brick according to this invention (Examples I to VI) were prepared from batches as shown in Table I. The various dead burned magnesites were prepared by making small additions of silica, lime hydrate, apatite, or phosphoric acid to caustic magnesite, briquetting the mixtures and dead burning the briquettes at temperatures in excess of 3000° F. No phosphate materials were added to the grains used in the preparation of Examples II and V. The dead burned magnesite grains were sized and graded to form pressable brickmaking batches. Suitable size gradings are shown in Table I. The size graded dead burned magnesites were combined with a small quantity of sodium phosphate glass binder shown in the table, and tempered with the small addition of water also shown in the table. The tempered batches were pressed into brick at about 8000 p.s.i. The brick were dried at about 250° F. for about 10 hours and, thereafter, tested for bulk density and modulus of rupture at room temperature, 2300° F., and 2600° F. The results of the testing are also shown in Table I. The $CaO:SiO_2:P_2O_5$ ratios of the exemplary brick after testing at 2600° F. are plotted on FIG. 1.

weak at elevated temperatures. As a matter of fact, prior art burned brick had strengths at 2600° F. of less than about 500 p.s.i. until our invention disclosed, in the parent application, Ser. No. 607,983.

The preferred composition and best known mode now known for the practice of the present invention is embodied in Example III.

Example V was prepared from a grain that contained 1.29% uncombined lime calculated by the following formula:

$$\text{Free } CaO = C - (2.8S + 1.01A + .7F + 1.17P)$$

where:

S=percentage $SiO_2$;
C=percentage CaO;
A=percentage $Al_2O_3$;
F=percentage $Fe_2O_3$; and
P=percentage $P_2O_5$ in the grain.

This calculation assumes that the lime will combine to form tricalcium silicate, tetracalcium phosphate, dicalcium ferrite, and dicalcium aluminate. The mix of Example V, when being tempered, became very warm and tended to dry out. Hence, 1.30% free lime is considered the largest amount of free lime that can be tolerated according to this invention. Preferably, the free lime should be less than 0.5%. In order that the free lime in the starting grain be minimized, it is necessary when the $CaO:SiO_2$ ratio is high to add $P_2O_5$ to the grain. Notice Example VI was manufactured from a grain containing 6.60% CaO and had a $CaO:SiO_2$ ratio of 10.8:1. However, it did not heat up on tempering as there was no uncombined CaO as calculated by the formula set forth above.

It had been our experience that a magnesite grain containing more than 0.2% free CaO would heat up when tempering with conventional binders and crack when being dried. The sodium phosphate binder, however, is exceptional in that it permits the presence of a larger amount of free lime.

TABLE I

| Example | I | II | III | IV | V | VI |
|---|---|---|---|---|---|---|
| Batch, percent: | | | | | | |
| Magnesite: | | | | | | |
| −4+10 mesh | 32 | 32 | 32 | 20 | 32 | 32 |
| −10+28 mesh | 33 | 32 | 33 | 34 | 32 | 33 |
| Ball milled fines (55% −325 mesh) | 33 | 33.25 | 33 | 34 | 33.25 | 33 |
| Sodium Phosphate Glass | 2 | 2.75 | 2 | 2 | 2.75 | 2 |
| Water Added | 3 | 3 | 3 | 3 | 3 | 3 |
| Chemical Analysis of Magnesite Grain, percent: | | | | | | |
| Silica ($SiO_2$) | 3.7 | 1.5 | 1.4 | 0.8 | 0.74 | 0.63 |
| Alumina ($Al_2O_3$) | 0.61 | 0.49 | 0.45 | 0.38 | 0.41 | 0.41 |
| Iron Oxide ($Fe_2O_3$) | 0.22 | 0.25 | 0.20 | 0.20 | 0.21 | 0.26 |
| Lime (CaO) | 8.20 | 4.5 | 5.10 | 3.71 | 3.9 | 6.60 |
| Magnesia (MgO) | | | The Remainder | | | |
| Phosphorus Oxide ($P_2O_5$) | 0.51 | 0.1 | 0.55 | 0.70 | 0.1 | 4.0 |
| Boron Oxide ($B_2O_3$) | 0.095 | 0.12 | 0.11 | 0.11 | 0.12 | 0.11 |
| Chemical Analysis of Brick After Testing at 2,600° F., percent: | | | | | | |
| Silica ($SiO_2$) | 3.8 | 1.5 | 1.3 | 0.8 | 0.65 | 0.6 |
| Alumina ($Al_2O_3$) | 0.61 | 0.49 | 0.45 | 0.38 | 0.41 | 0.41 |
| Iron Oxide ($Fe_2O_3$) | 0.27 | 0.25 | 0.25 | 0.20 | 0.25 | 0.29 |
| Lime (CaO) | 8.7 | 4.6 | 4.4 | 3.71 | 3.90 | 6.5 |
| Magnesia (MgO) | | | The Remainder | | | |
| Phosphorous Oxide ($P_2O_5$) | 1.40 | 1.40 | 1.70 | 1.90 | 1.5 | 4.6 |
| Boron Oxide ($B_2O_3$) | 0.075 | 0.085 | 0.075 | 0.09 | 0.085 | 0.075 |
| Soda ($Na_2O$) | 0.56 | 0.66 | 0.57 | 0.61 | 0.63 | 0.60 |
| $CaO+SiO_2$ | 12.5 | 6.1 | 5.7 | 4.5 | 4.55 | 7.1 |
| $CaO:SiO_2$ ratio | 2.3:1 | 3.06:1 | 3.4:1 | 4.6:1 | 6.0:1 | 10.8:1 |
| Bulk Density, pcf | 180 | 181 | 180 | 180 | 182 | 175 |
| Modulus of Rupture, p.s.i.: | | | | | | |
| At Room Temperature | 1,080 | 1,020 | 1,260 | | 770 | 1,070 |
| At 2,300° F | 1,690 | 1,500 | 1,620 | 1,520 | 1,290 | 1,580 |
| At 2,600° F | 1,180 | 1,430 | 1,460 | 1,430 | 1,120 | 500 |
| Ratio: | | | | | | |
| CaO | 62.6 | 61.3 | 59.5 | 57.9 | 64.5 | 55.6 |
| $SiO_2$ | 27.3 | 20.0 | 17.6 | 12.5 | 10.7 | 5.1 |
| $P_2O_5$ | 10.1 | 18.7 | 23.0 | 29.6 | 24.8 | 39.3 |

Table I establishes that brick made according to the teachings of the present invention have tensile strength at 2600° F. as tested by the modulus of rupture over 500 p.s.i. This is considered indeed surprising because chemically bonded brick (unburned) are known to be very In order to demonstrate the necessity for $$CaO:SiO_2:P_2O_5$$

ratio to be close to the dicalcium silicate-tricalcium phosphate join, Examples VII, VIII, and IX were prepared in the same manner as Examples I through VI. Notice that they fell just outside of the area A–B–C–D–E on FIG. 1.

Example X was prepared in the same manner as the other examples, but according to the present invention.

TABLE II

| Example | VII | VIII | IX | X |
|---|---|---|---|---|
| Batch, percent: | | | | |
| Magnesite: | | | | |
| −4+10 mesh | 30 | 30 | 32 | 29.5 |
| −10+28 mesh | 34 | 34 | 33 | 34.5 |
| Ball milled fines (55%−325 mesh) | 34 | 34 | 33 | 34.5 |
| Sodium Phosphate Glass | 2 | 2 | 2 | 1.38 |
| Water Added | 3 | 3 | 3 | 3 |
| Chemical Analysis of Brick After Testing at 2,600° F., percent: | | | | |
| Silica ($SiO_2$) | 1.1 | 1.4 | 1.1 | 0.70 |
| Alumina ($Al_2O_3$) | 0.50 | 0.55 | 0.44 | 0.36 |
| Iron Oxide ($Fe_2O_3$) | 0.31 | 0.31 | 0.24 | 0.27 |
| Lime (CaO) | 3.80 | 3.6 | 5.0 | 2.25 |
| Magnesia (MgO) | The Remainder | | | |
| Phosphorous Oxide ($P_2O_5$) | 1.9 | 1.9 | 1.4 | 0.94 |
| Boron Oxide ($B_2O_3$) | 0.07 | 0.08 | 0.1 | 0.02 |
| Soda ($Na_2O$) | 0.65 | 0.63 | 0.60 | 0.43 |
| $CaO+SiO_2$ | 4.9 | 5.0 | 6.6 | 2.95 |
| $CaO:SiO_2$ ratio | 3.5:1 | 2.6:1 | 4.55:1 | 3.2:1 |
| Bulk Density, pcf | 179 | 180 | 177 | 182 |
| Modulus of Rupture, p.s.i.: | | | | |
| At Room Temperature | | | 420 | 1,210 |
| At 2,300° F | 1,390 | 1,250 | 610 | 1,180 |
| At 2,600° F | 320 | 100 | 460 | 1,590 |
| Ratio: | | | | |
| CaO | 55.9 | 52.2 | 66.7 | 57.8 |
| $SiO_2$ | 16.2 | 20.3 | 14.7 | 18.0 |
| $P_2O_5$ | 27.9 | 27.5 | 18.7 | 24.2 |

Table II establishes that the area A–B–C–D–E on FIG. 1 is critical. All mixes except Example X had relatively low modulus of rupture at 2600° F.

It should be understood it is not necessary for mixes according to this invention to have $CaO:SiO_2:P_2O_5$ ratios precisely on the dicalcium silicate-tricalcium phosphate join. The suitable ratios are within the approximate area A–B–C–D–E on FIG. 1. It has been found that mixes having $CaO:SiO_2:P_2O_5$ ratios within this area are sufficiently close to the dicalcium silicate-tricalcium phosphate join to have strength in excess of 500 p.s.i. in the modulus of rupture test at 2600° F. Line D–E has a $CaO:SiO_2$ ratio of 12:1; line F–G a $CaO:SiO_2$ ratio of 6:1; and line B–C has a $CaO:SiO_2$ ratio of 2:1. It has been found that mixes having $CaO:SiO_2$ ratios between 2:1 and 6:1 are more easily manufactured. Hence, it is preferable that the brick made according to this invention have $CaO:SiO_2:P_2O_5$ ratios falling within the approximate area A–B–C–F–G on FIG. 1.

While it is not necessary that the dead burned magnesite grain contain any $P_2O_5$, it is desirable that the grain contain at least 0.2% $P_2O_5$, preferably between about 0.2 and 1%. It has been found that brick made from grain containing at least 0.2% $P_2O_5$ is easier to manufacture and consistently have superior properties. This is especially true for magnesite grains having a high $CaO:SiO_2$ ratio.

While it is preferred according to this invention to manufacture brick by combining dead burned magnesite grain and a soluble sodium phosphate binder, it is possible to adjust the $CaO:SiO_2:P_2O_5$ ratio by making additions of silica and apatite or other CaO, $SiO_2$, and $P_2O_5$ yielding materials to the brick batch.

Figure 2:
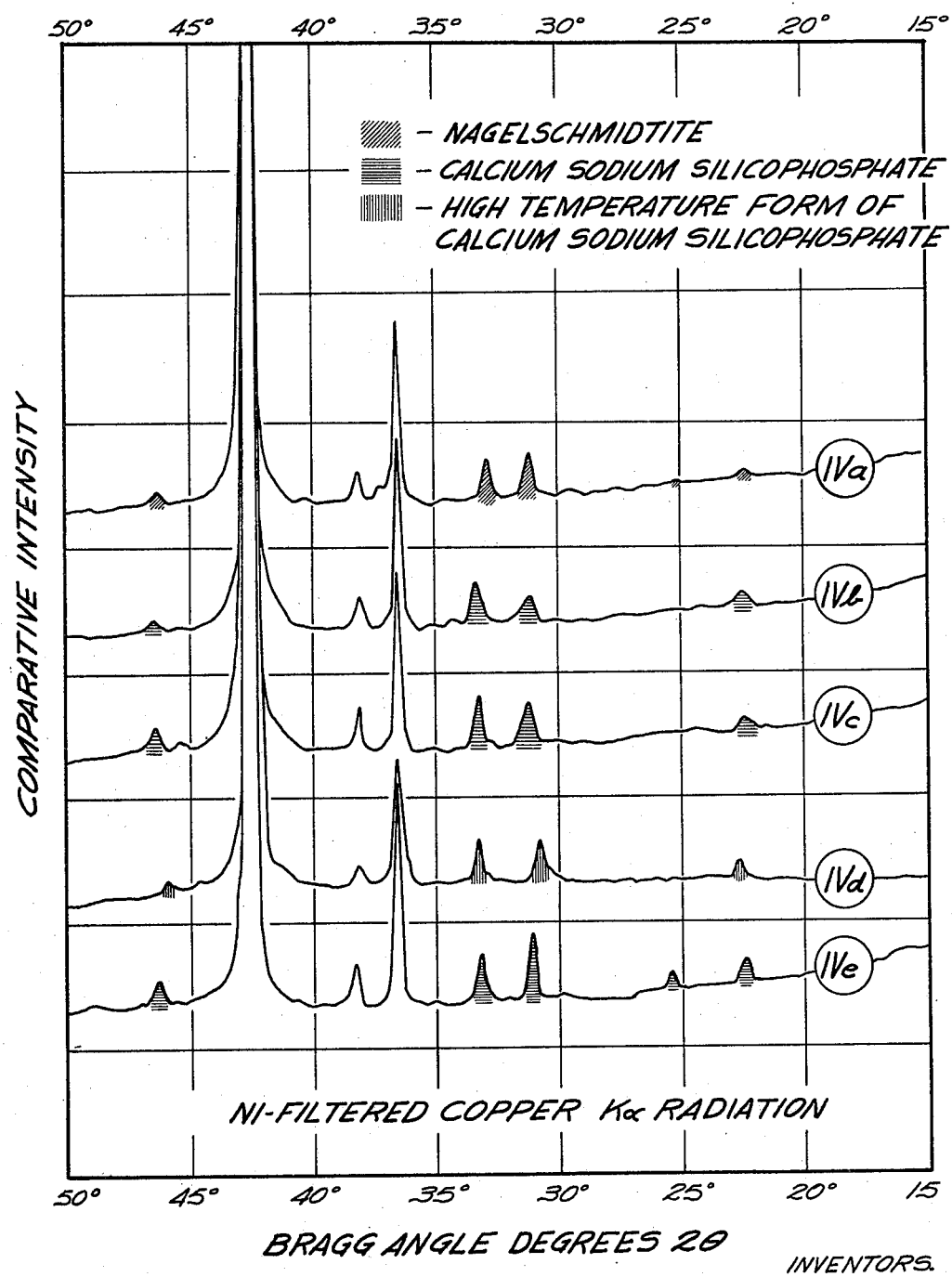
FIG. 2 contains X-ray diffraction patterns of one of the examples hereinafter discussed.

To obtain a better understanding of our invention, X-ray diffraction studies of Example IV were carried out at various temperatures after various heat treatments. The X-ray diffraction patterns are given in FIG. 2. The grain from which brick in Example IV were prepared contained nagelschmidtite (a calcium silicophosphate) as the predominant mineral component other than periclase (see pattern IVa on FIG. 2). The grain had a $CaO:SiO_2:P_2O_5$ molar ratio of about 10:2:1. A calcium sodium silicophosphate phase was developed in the brick after bonding with sodium phosphate glass and heating to 2300 and 2600° F. (patterns IVb and IVc). The brick had a $CaO:Na_2O:SiO_2:P_2O_5$ molar ratio of about 5:0.7:1:1. High-temperature X-ray diffraction analysis in the temperature range up to 2600° F. showed no inversion of the calcium sodium silicophosphate structure. The structure of the high-temperature form at 2600° F. (pattern IVd) and at room temperature are concordant. Finally, it was found that the structure of the calcium sodium silicophosphate phase became better ordered after extended periods at elevated temperatures (pattern IVe).

While we do not completely understand the scientific basis for our invention, we believe soluble sodium phosphate imparts high-temperature strength to chemically bonded magnesite brick by the development in service of a calcium sodium silicophosphate bond. Excellent hot strength at 2600° F. is attained in the calcium sodium silicophosphate compositional range approximating the $2CaO \cdot SiO_2$—$3CaO \cdot P_2O_5$ join of the $2CaO \cdot SiO_2$—$3CaO \cdot P_2O_5$—$Na_2O$ plane in the system $$CaO \cdot Na_2O \cdot SiO_2 \cdot P_2O_5$$

(see FIG. 1). The $7CaO \cdot Na_2O \cdot 2SiO_2 \cdot P_2O_5$ and $$5CaO \cdot Na_2O \cdot SiO_2 \cdot P_2O_5$$

compositional points mark the areas of optimum high-temperature strength. The calcium sodium silicophosphate solid solution is developed in a solid state reaction between sodium phosphate and various calcium silicates or calcium silicophosphates at relatively low temperatures (below 2300° F.) aided, apparently, by the reaction-accelerating effect of the sodium cation. The refractoriness of the system is not affected detrimentally by the limited presence of sodium. Sodium enters the calcium silicophosphate structure filling vacant calcium positions in the lattice which are unoccupied because of the difference in valence between $SiO_4$ and $PO_4$ groups. Substances, particularly solid solutions, with unoccupied cation positions are not unusual. In effect, the sodium ions are isolated and not available for reaction with other components to form low melting compounds. The structure of the calcium sodium silicophosphate solid solution is analogous to the high-temperature form of the calcium silicophosphate solid solution series suggesting that sodium effectively stabilizes the calcium silicophosphate structure in its high-temperature form. Strength variations at elevated temperatures, attributable to structural inversions, are consequently eliminated.

RAW MATERIALS AND TEST PROCEDURES

As a soluble sodium phosphate binder, we prefer a sodium phosphate glass which is molecularly dehydrated and polymerized. These have an $Na_2O \cdot P_2O_5$ ratio generally ranging from 1.1: to 1.8:1. These glasses are highly soluble, but retain their molecular structure well in such solutions. Commercial metaphosphate glasses ($Na_2O:P_2O_5$ ratio is 1:1) include "Glass H" and "Glass A," proprietary products of the F.M.C. Corporation, and "Calgon," a proprietary product of the Calgon Corporation. "Quadrophos" is a proprietary product of the Rumford Chemical Corporation and is a suitable sodium phosphate glass which has an $Na_2O:P_2O_5$ ratio of 1.5:1.

The bulk density of the sample was determined by ASTM methods C134–41, Manual of ASTM Standards on Refractory Materials, 9th edition, 1963, pages 154 et seq. Modulus of rupture at room temperature was determined by ASTM Methods C133–55, pages 145 et seq. of the same manual; modulus of rupture at room temperature, except this test was performed in an electrically-heated furnace.

PHASE STUDIES

Standard X-ray powder diffraction procedures were followed in the qualitative determination of the phase composition of the refractory test specimens.

A General Electric XRD–5 X-ray Diffractometer unit equipped with spectrogoniometer, gas-flow proportional counter, and potentiometric strip-chart recorder was used. Powder mounts were scanned in the angular range 5° to 70° 2θ using Ni-filtered Cu K2 radiation. Instrument settings were: tube voltage 50 kv.; tube current 13.5–15.5 ma.; input discriminator 2.5 v.; beam slit 3°; receiving slit 0.2°; time constant 2 seconds; recorder range 2000 counts per second; and scanning speed 2° $2\theta$ per minute.

Interplanar ($d$) spacings and relative intensities of reflections were determined from diffraction patterns by calculation using tables of interplanar spacings as a function of $2\theta$ and by visual estimation with a calibrated scale. Identification of the diffracting phases was effected following a standardized procedure in which $d$ values and relative intensities were compared with published diffraction data and reference patterns. The primary reference source for powder diffraction data was the Powder Diffraction File, published by the American Society For Testing Materials (1964). The Numerical (Hanawalt), Alphabetical (Davey), and Fink indexes to the Powder Diffraction File were used. Additional diffraction data was obtained from published scientific papers.

Having thus described the invention in detail and with sufficient particularity as to enable those skilled in the art to practice it, what is desired to have protected by letters patent is set forth in the following claims:

We claim:

1. Chemically bonded magnesite brick having a soluble sodium phosphate binder, said brick having a $CaO:SiO_2:P_2O_5$ ratio sufficiently close to the dicalcium silicate-tricalcium phosphate join on the $CaO-SiO_2-P_2O_5$ ternary diagram to form a calcium sodium silicophosphate bond when heated, the brick having a modulus of rupture at 2600° F. of at least 500 p.s.i.

2. Chemically bonded magnesite brick according to claim 1, in which the brick is formed from a batch consisting essentially of dead burned magnesite grain containing less than about 1.3% free lime and a sodium phosphate glass binder yielding at least 0.5% $P_2O_5$, said brick analyzing about 2 to 13% $CaO+SiO_2$, said brick having a $CaO:SiO_2$ weight ratio between about 2:1 and 12:1, said brick having a $CaO:SiO_2:P_2O_5$ weight ratio falling within the area A–B–C–D–E on FIG. 1.

3. Brick made according to claim 2 having a
$$CaO:SiO_2:P_2O_5$$
ratio falling within the area A–B–C–G–F on FIG. 1.

4. Brick made according to claim 2 in which the magnisite grain contains between 0.2 and 1% $P_2O_5$.

5. Brick according to claim 2 in which the magnetic grain contains less than about 0.5% free lime.

6. Brick according to claim 2 in which the batch comprises lime, silica, and phosphate-yielding materials.

References Cited

UNITED STATES PATENTS

| | | | |
|---|---|---|---|
| 3,275,461 | 9/1966 | Davies et al. | 106—58 |
| 3,304,187 | 2/1967 | Limes et al. | 106—58 |
| 3,357,842 | 12/1967 | Bowman | 106—58 |
| 3,392,037 | 7/1968 | Neely et al. | 106—58 |

JAMES E. POER, Primary Examiner

U.S. Cl. X.R.

106—63